(12) United States Patent
Li et al.

(10) Patent No.: US 12,407,259 B2
(45) Date of Patent: Sep. 2, 2025

(54) METHOD AND APPARATUS FOR SUPPRESSING AUDIBLE BUZZ FROM HIGH-EFFICIENCY SWITCHING-MODE POWER SUPPLY

(71) Applicant: Avago Technologies International Sales Pte. Limited, Singapore (SG)

(72) Inventors: Shengyuan Li, Irvine, CA (US); Jianlong Chen, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 307 days.

(21) Appl. No.: 18/117,344

(22) Filed: Mar. 3, 2023

(65) Prior Publication Data
US 2024/0297584 A1    Sep. 5, 2024

(51) Int. Cl.
*H02M 3/158* (2006.01)
*H02M 1/00* (2006.01)
*H02M 1/14* (2006.01)

(52) U.S. Cl.
CPC ....... *H02M 3/1582* (2013.01); *H02M 1/0045* (2021.05); *H02M 1/143* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582;
(Continued)

(56) References Cited

U.S. PATENT DOCUMENTS 6,100,827 A * 8/2000 Boesch ............... H04L 27/2071
                                                              375/E1.022
6,583,610 B2 * 6/2003 Groom ................... H02M 3/156
                                                              323/224
(Continued)

FOREIGN PATENT DOCUMENTS

EP        4199333 A1 *  6/2023  .......... H02M 1/0025

OTHER PUBLICATIONS

Foreign Search Report on non-Foley case related to U.S. Appl. No. 18/117,344 DTD Nov. 12, 2024.

*Primary Examiner* — Sean Kayes
*Assistant Examiner* — Nusrat Quddus
(74) *Attorney, Agent, or Firm* — Foley & Lardner LLP

(57) ABSTRACT

A circuit includes a boost circuit, a first circuit coupled to the boost circuit and a second circuit coupled to the boost circuit. The boost circuit, the first circuit, and the second circuit form an open loop. The first circuit and the second circuit maintain a switching frequency of the boost circuit above a threshold frequency.

19 Claims, 5 Drawing Sheets

(58) Field of Classification Search
CPC ......... H02M 2003/1557; H05B 39/048; B23K 11/24; H04B 2215/069
See application file for complete search history.

(56) References Cited

U.S. PATENT DOCUMENTS

| | | | | |
|---|---|---|---|---|
| 7,589,983 | B1* | 9/2009 | Lin | H02M 3/33515 |
| | | | | 363/21.13 |
| 7,777,470 | B2* | 8/2010 | Lindeberg | H02M 3/1563 |
| | | | | 323/283 |
| 9,345,083 | B2 | 5/2016 | Hussain et al. | |
| 9,547,929 | B1* | 1/2017 | Whitlow | G06T 1/20 |
| 10,845,833 | B1 | 11/2020 | Dietrich et al. | |
| 11,356,010 | B2* | 6/2022 | Sundararaj | H02M 1/007 |
| 11,817,785 | B2* | 11/2023 | Raithatha | H02M 3/1582 |
| 2010/0244801 | A1 | 9/2010 | Arora et al. | |
| 2015/0244257 | A1 | 8/2015 | Dalwadi et al. | |
| 2017/0005575 | A1* | 1/2017 | Wang | H02M 3/156 |
| 2018/0337601 | A1* | 11/2018 | Vadnerkar | H02M 3/158 |
| 2020/0328679 | A1 | 10/2020 | Shu | |
| 2024/0235367 | A1* | 7/2024 | Krabbenborg | H02M 3/156 |
| 2024/0313638 | A1* | 9/2024 | Krabbenborg | H02M 1/0009 |

* cited by examiner

METHOD AND APPARATUS FOR SUPPRESSING AUDIBLE BUZZ FROM HIGH-EFFICIENCY SWITCHING-MODE POWER SUPPLY

TECHNICAL FIELD

The present description relates generally to electronic circuits, including, for example, a method and apparatus for suppressing audible buzz from a high-efficiency switching-mode power supply.

BACKGROUND

A switching-mode power supply (SMPS) switches on a power stage to charge an inductor during a duty cycle time set by a pulse width modulator. The stored energy in the inductor will then be transferred to output by switching off the power stage during the rest of this switching cycle. This kind of switching behavior makes SMPS's startup current a triangular shape instead of a direct current (DC) as in the linear regulators, which suggests that the SMPS's input current would have a high crest factor.

An SMPS can operate either in active mode or standby mode. The active mode is for normal operation, where SMPS supports the load while maintaining output voltage regulation under all kinds of disturbances. The load current level in active mode can take any values between zero to full load (e.g., 600 mA load). To achieve a higher efficiency at the light load, pulse frequency modulation (PFM) is usually adopted to skip pulses so switching loss can be reduced. Therefore, the PFM frequency can be lower than 20 Kilohertz (KHz) and enters the audible band at the light load. This is undesirable, as it can degrade a signal-to-noise ratio (SNR) of the system and cause an audible buzz tone/noise issue at the output capacitors of the SMPS.

An existing technique uses a closed control loop to sense the PFM frequency and regulate it to a set value with a current digital-to-analog converter (IDAC) as a dummy load. The drawbacks of this technique can be attributed to the complexity, large chip area, and limited speed of the used closed control-loop circuit.

BRIEF DESCRIPTION OF THE DRAWINGS

Certain features of the subject technology are set forth in the appended claims. However, for purposes of explanation, several aspects of the subject technology are depicted in the following figures:

DETAILED DESCRIPTION

Figure 1:
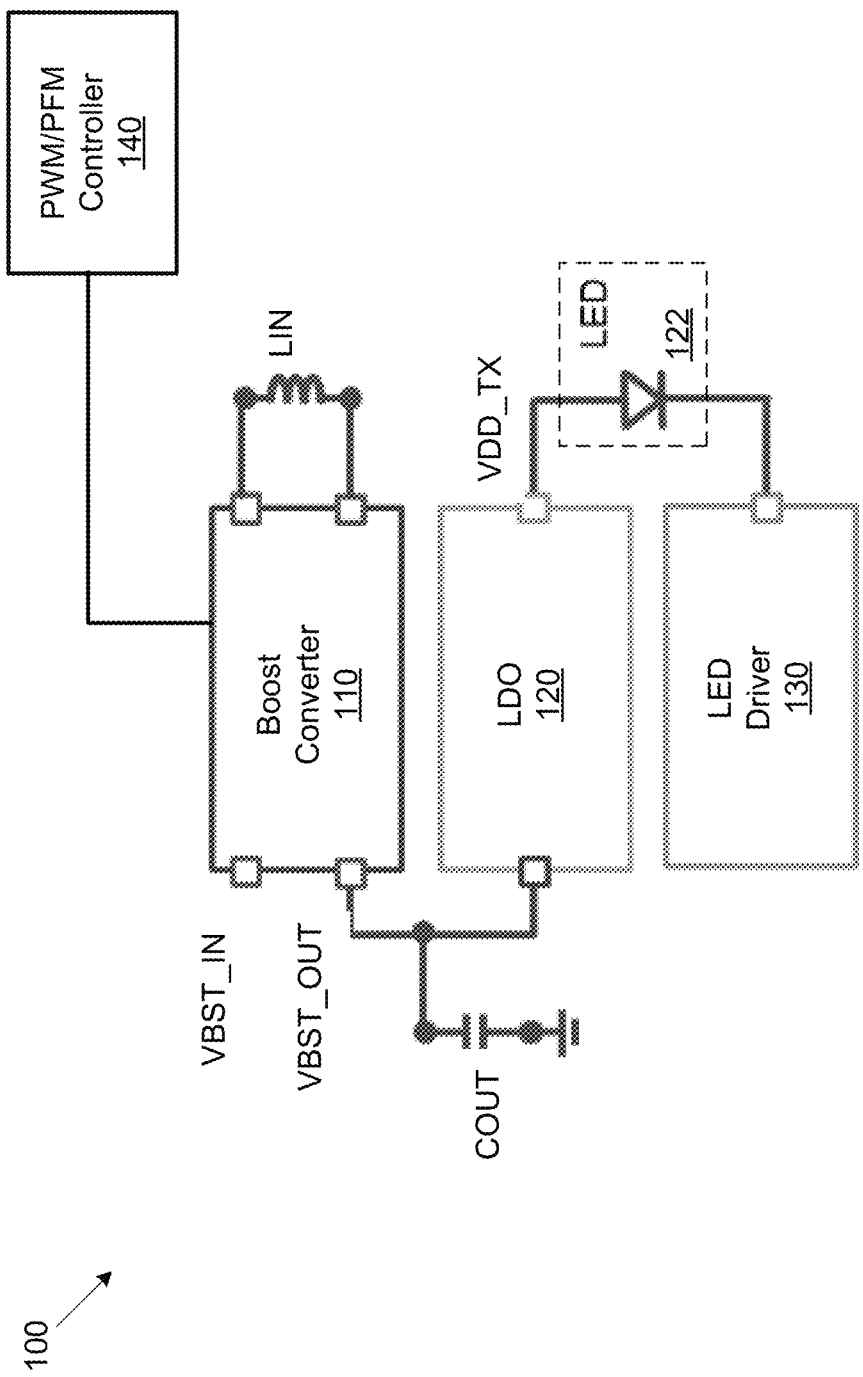
FIG. 1 illustrates a high-level diagram illustrating an example of a regulator circuit, within which some aspects of the subject technology are implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

According to some aspects, the subject technology is directed to a method and apparatus for suppressing audible buzz from a switching-mode power supply of an electronic device. In some embodiments, the electronic device includes, but is not limited to, a wearable device such as a smart watch or other similar types of devices. In some embodiments, a regulator circuit of the subject technology includes a boost circuit (boost converter circuit or boost converter) to provide an output voltage greater than a voltage of a power source, a circuit coupled to the boost to reduce an audible noise and improve an SNR of the regulator circuit by implementing an open loop scheme. An "open loop" in a circuit refers to a lack of feedback such that the output of a component is not dependent upon the control or other action of another component or system. In some embodiments, the open loop scheme is configured to suppress an audible noise generated by mechanical vibration of an output capacitor. The suppression of the audible noise is achieved by moving the signal outside the audio band so that the audio noise is not hearable by human beings. The open loop scheme prevents a switching frequency of the boost circuit from dropping below an audible frequency. In some embodiments, the switching frequency is the frequency of the pulses that are applied to switches of the boost circuit to switch an output current of the boost circuit.

In some embodiments, the circuit includes a digital-to-analog converter (DAC) such as a current DAC (IDAC) that implements the open loop scheme by receiving an input data from a third circuit. In some embodiments, the third circuit receives a first current and a second current and subtracts the second current from the first current to provide a third current. In some embodiments, the first current is a first digital current corresponding to a first threshold value determined experimentally to correspond to a load current associated with the audible threshold frequency. In some embodiments, the second current is a second digital current corresponding to an instant load current derived from an output port of the boost circuit. In some embodiments, the third current is provided to the DAC that provides a dummy current to the boost circuit based on the third current. In some embodiments, the dummy current provided by the DAC causes the switching frequency associated with the boost converter to stay above the threshold frequency.

The open loop scheme of the subject technology has advantageous features (e.g., reduced complexity, reduced area, and greater speed) compared to an existing technique that uses a closed loop circuit, in which an output is dependent upon the control or other action of another component or system. The advantageous features include less complexity, smaller chip area, and higher speed, as demonstrated herein.

FIG. 1 is a high-level diagram illustrating an example of a regulator circuit 100, within which some aspects of the subject technology are implemented. In some embodiments, the regulator circuit 100 is an SMPS that operates without audible noise and includes, but is not limited to, a boost circuit 110 a low drop-out (LDO) circuit 120, an LED driver circuit 130, and a pulse-width modulation (PWM)/PFM controller circuit 140. In some embodiments, the boost circuit 110 can provide an output voltage larger than a voltage of a power supply (e.g., battery) that can be provided as in input voltage (VBST_IN) of the boost circuit 110. In some embodiments, the boost circuit 110 is a boost converter circuit and includes switches that provide high frequency pulses (e.g., within a range of about tens of kHz to a few MHz) that can charge an inductor LIN, which can discharge to an output load of the regulator circuit 100. To achieve a higher efficiency at low-load current levels, the PFM can be adapted to skip pulses so switching loss can be reduced. The PFM frequency can be lower than 20 KHz and enters the audible band at a low current load. This is undesirable, as it can degrade an SNR of the regulator circuit 100 and cause an audible noise issue at the output capacitor (COUT) of the regulator circuit 100.

The LDO circuit 120 is a regulator that is used to smooth the output voltage (VBST_OUT) of the boost circuit 110. The LED driver circuit 130 is a circuit that provides a load current drawn by the LED 122. In some embodiments, the PWM/PFM controller circuit 140 is a control circuit or a processor that can control the switching behavior of the boost converter. In some embodiments, the switching behavior includes, but is not limited to, a switching pulse frequency and/or a switching pulse duty cycle. In some embodiments, the PWM/PFM controller circuit 140 generates a clock signal (e.g., a PWM clock signal 244) having a predetermined pulse width and frequency for maintaining the switching frequency. In some embodiments, the predetermined pulse width and frequency can be determined experimentally. The subject technology improves the existing closed loop technique by implementing an open loop scheme using a circuit coupled to the boost circuit 110, as further discussed herein.

Figure 2:
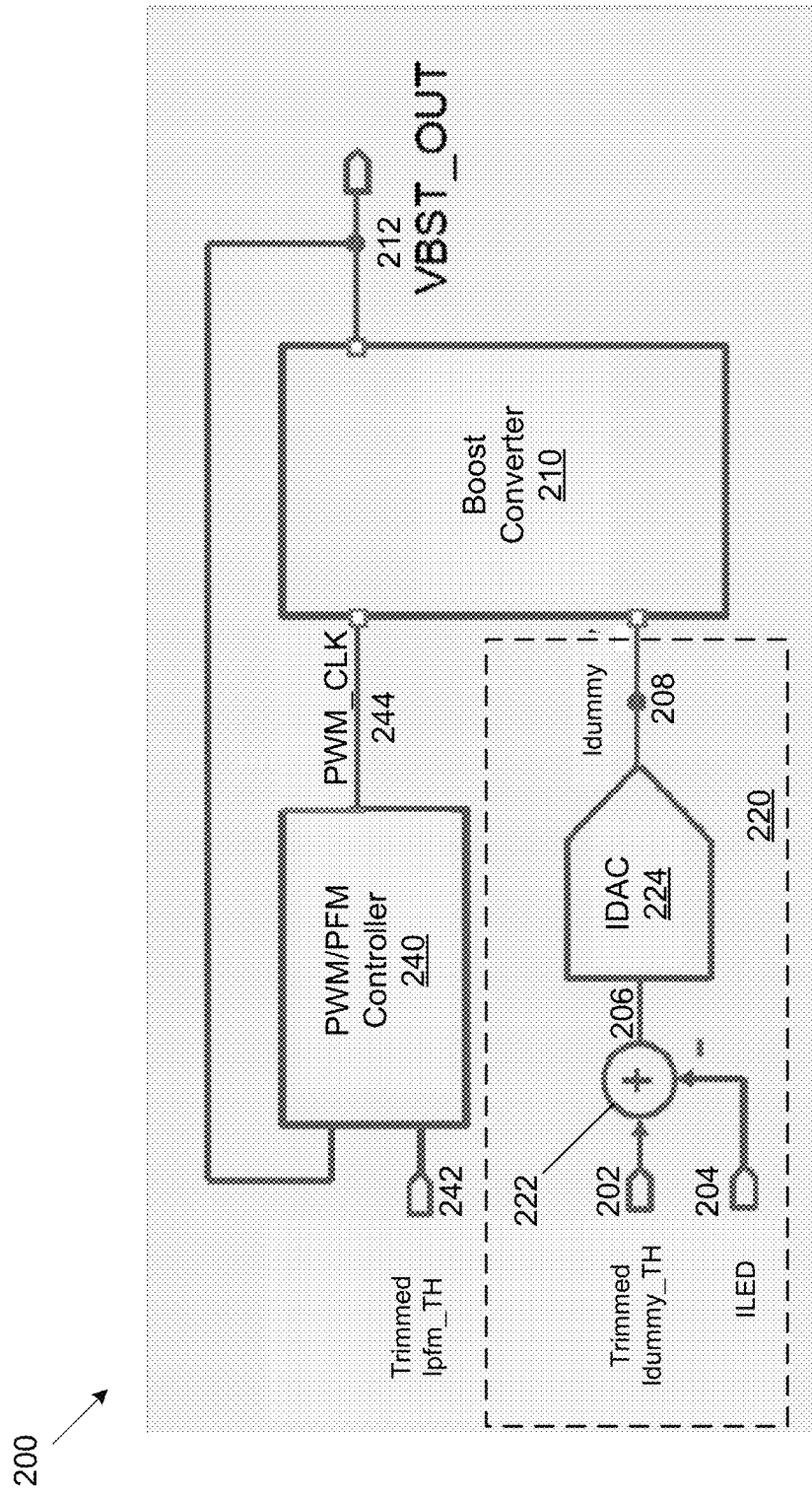
FIG. 2 illustrates a block diagram of an example of an integrated circuit for implementing an open loop scheme, according to aspects of the subject technology.

FIG. 2 is a block diagram of an example of an integrated circuit 200 for implementing an open loop scheme, according to aspects of the subject technology. In some embodiments, the integrated circuit 200 is a regulator circuit that operates without audible noise. The integrated circuit 200 includes a boost circuit 210, a circuit 220 coupled to the boost circuit 210, and a controller circuit 240. As shown, the controller circuit 240 may include a PWM/PFM controller circuit that controls PWM and PFM operations that produce the PWM_CLK for the boost circuit 210. The boost circuit 210 is similar to the boost circuit 110 of FIG. 1 and performs similar functionalities. In some embodiments, the boost circuit 210 provides a pulsed output current to a load such as the LED 122 of FIG. 1.

According to one approach, a boost circuit and a controller circuit (e.g., PFM frequency controller circuit) are in a closed loop schemed (e.g., closed loop circuit) with a dummy load. A "dummy load" may refer to a device used to simulate (e.g., electrically simulate) an electrical load in a circuit, thus allowing for functions such as adjustment and testing. In this approach, switching frequency of the boost circuit is sensed by the controller circuit in the closed loop, and the controller circuit instructs the dummy load to increase output voltage. When the boost circuit switching frequency is proportional to the output voltage, the boost circuit switching frequency increases with increased output voltage. Accordingly, the controller circuit provides feedback and used the dummy load "self-correction."

However, in the approach shown in FIG. 2, an open loop scheme (e.g., open loop circuit) is implemented. For example, a current DAC circuit 224 (IDAC; used as a dummy load) does not provide an input (e.g., no feedback) to the controller circuit 240, and vice versa. Thus, there is no feedback control in the integrated circuit 200. Beneficially, the non-feedback control can reduce circuit complexity and increase speed.

In some embodiments, the circuit 220 can keep a switching frequency of the pulsed output current above a threshold frequency. In some embodiments, the threshold frequency is an audible threshold frequency, such as 20 kHz (e.g., a threshold frequency above which is not hearable by most human beings). Beneficially, frequencies above the threshold frequency are above an audible frequency range, thus suppressing the audible noise (buzz) and increasing an SNR of the integrated circuit 200.

The circuit 220 includes a third circuit 222 and the IDAC circuit 224. As shown, the third circuit 222 receives a current 202 and a current 204 and subtracts the current 204 from the current 202 to provide a current 206 at the output of the third circuit 222. The current 206 is provided to the IDAC circuit 224. The IDAC circuit 224 converts the third current to an analog current such as a dummy current 208 and provides the dummy current 208 to the boost circuit 210. In some embodiments, the dummy current 208 provided by the DAC circuit 224 causes the switching frequency of the boost circuit 210, for example, the switching frequency of the pulsed output current of the boost circuit 210 to stay above the threshold frequency (e.g., about 20 KHz). As a result, the boost circuit 210 does not generate audible noise.

In some embodiments, the current 202 is a digital current that corresponds to a first threshold value and is determined experimentally, as discussed below, to correspond to a load current associated with the threshold frequency. In some embodiments, the threshold frequency is a frequency associated with an audible threshold frequency (e.g., a frequency that can be heard by the human ear). The frequencies below the audible threshold frequency (e.g., about 20 KHz) can reduce the SNR of the boost circuit 210 and can generate audible noise (buzz) at an output capacitor (e.g., COUT of FIG. 1) of the boost circuit 210. In some embodiments, the current 204 is a digital current corresponding to a load current derived from an output port 212 of the boost circuit 210.

To determine the current 202 (Trimmed Idummy_TH), automated test equipment (ATE) can be used to determine an amount of current needed through trimming (e.g., adjustment) for a target minimum switching frequency when the load current (e.g., current 204) is set to zero. If the audible frequency is approximately 20 KHz, the target minimum switching frequency may be selected much higher (e.g., 100 KHz) to ensure the current 202 contributes to a switching frequency of the boost circuit 210 well above threshold frequency 20 KHz. The determined trimmed value (e.g., current 202) is applied as the Trimmed Idummy_TH to the third circuit 222, while the current 204 is the LED current (ILED) derived from the output port 212 of the boost circuit 210. When the current 204 (ILED) is less than the current 202 (Trimmed Idummy_TH), which is determined at the third circuit 222, the difference is the dummy current 208 (Idummy). This process ensures the dummy current 208 is a minimum current provided to the boost circuit 210 such that the switching frequency of the boost circuit 210, based at least in part on the current) switches at the target minimum switching frequency, which is well above the audible threshold frequency.

In some embodiments, the circuit 220 and the controller circuit 240 are processor circuit that, collectively, always maintain the switching behavior (e.g., switching frequency)

of the boost circuit 210 above a threshold frequency to suppress the audible buzz/noise. In some embodiments, a value 242 (of Trimmed Ipfm_TH) is a predetermined current (e.g., provided as a design specification) selected such that, when provided to the boost circuit 210, causes the boost circuit 210 to operate in a PWM mode. When the booster circuit 210 operates in the PWM mode, the boost circuit 210 does not skip pulses and will not reduce the switching frequency below the threshold frequency, upon determination that the output current of the boost circuit 210 at the output port 212 exceeds the second threshold value. In some embodiments, the controller circuit 240 provides the PWM clock signal 244 (PWM_CLK) to the boost circuit 210 to control the switching behavior of the boost circuit 210. Also, as can be observed in FIG. 2, the circuit 220 and the controller circuit 240 have separate inputs that are not interconnected. For example, the value 242 (of Trimmed Ipfm_TH) and the current 202 (Trimmed Idummy_TH) are separate from each other such that the circuit 220 and the controller circuit 240 are driven by different sources. Put another way, the same source (e.g., voltage source, current source) does not supply current for the value 242 and the current 202 as part of the open loop scheme.

The Ipfm threshold trim (Trimmed Ipfm_TH) results from the ATE trim based on the desired PFM load threshold provided by the specification. In some embodiments, the Trimmed Ipfm_TH corresponds to a value of about 140 mA of the PFM load threshold. In other words, when the load (ILED) of the boost circuit 210 is greater than 140 mA, the boost circuit 210 would operate in PWM mode with a fixed 2.1 MHz PWM switching frequency. Only when the ILED is smaller than 140 mA, the boost circuit would start to skip PWM pulses and would operate in the PFM mode with an equivalent switching frequency less than about 2.1 MHz.

The trimmed Idummy threshold (Trimmed Idummy_TH) originates from another ATE trim after the above Ipfm_TH trim is completed. The Trimmed Idummy_TH corresponds to the load (ILED) needed for the boost circuit 210 to operate in the PFM mode with a switching frequency above the audio band. In some embodiments, the PFM switching frequency is set to about 100 KHz. In some embodiments, when the ILED>Ipfm_TH (e.g., 140 mA), the boost circuit 210 operates in the PWM mode with a fixed PWM switching frequency (e.g., 2.1 MHz). When Idummy_TH<ILED<Ipfm_TH, the boost circuit 210 would operate in the PFM mode with an equivalent switching frequency greater than a frequency of choice above the audio band (e.g., about 100 KHz). In some embodiments, when ILED<Idummy_TH, the boost circuit 210 would add in the Idummy_TH-ILED to the load so that the combined load seen by the boost circuit 210 is Idummy_TH. Therefore, the boost circuit 210 would operate in the PFM mode with an equivalent switching frequency of choice (e.g., about 100 KHz).

Figures 3A, 3B:
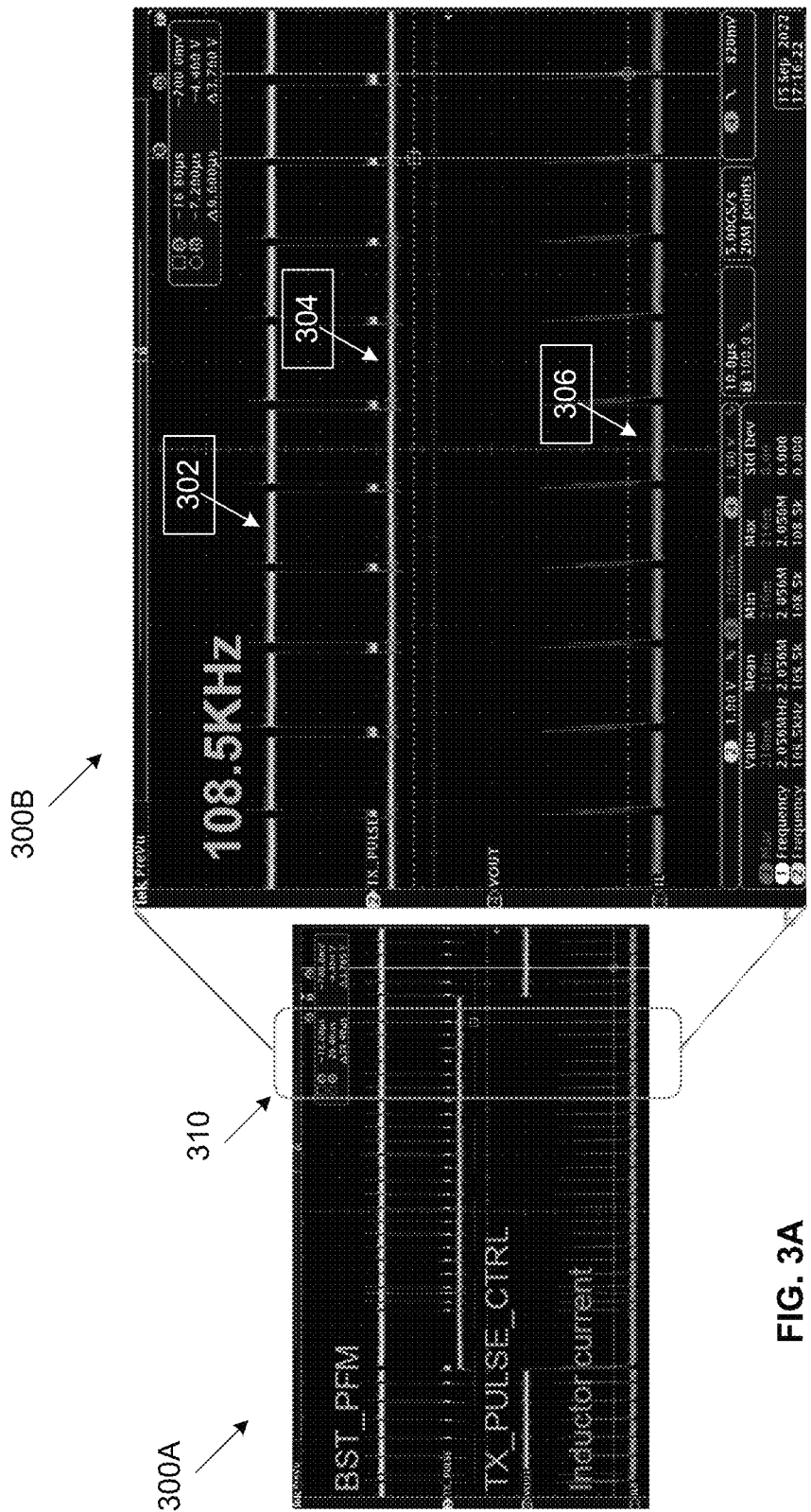
FIGS. 3A and 3B illustrate charts illustrating example plots of silicon measurement results associated with a boost converter, according to aspects of the subject technology.

FIGS. 3A and 3B are charts 300A and 300B illustrating example plots 302, 304, and 306 of silicon measurement results associated with a boost converter, according to aspects of the subject technology. The chart 300B is a blown-up view of a portion 310 of the chart 300A and includes the plots 302, 304, and 306. The plot 302 shows the time variation of a boost converter PFM (BST_PFM) pulse. The plot 304 depicts the time variation of a transmission (TX) control pulse (TX_PULSE_CTRL), and the plot 306 illustrates a time variation of the inductor current (e.g., inductor LIN of FIG. 1).

The measure data shown in FIG. 3B are associated with the boost circuit 210 of FIG. 2. The boost circuit 210 enters an active mode when TX_PULSE_CTRL shown in the plot 304 toggles to a high state. With no load present in the measurement (e.g., the current 204 of FIG. 2 being zero), the boost circuit 210 of FIG. 2 enters the PFM mode instead of the PWM mode (e.g., instead of switching with a fixed high frequency, such as 2 MHz in the PWM mode, the boost circuit 210 would try to skip as many switching pulses as possible in PFM mode to improve efficiency as long as the output voltage regulation can be maintained. The dummy load (Idummy current 208 of FIG. 2) provided by the circuit 220 of FIG. 2 toggles high immediately after the TX_PULSE_CTRL toggles high and would be the same as the Trimmed_Idummy_TH (current 202 of FIG. 2), as ILED turns to zero. Note that Idummy is smaller than the value 242 of the Trimmed Ipfm_TH of FIG. 2, therefore, once boost circuit 210 settles, it will still be in PFM mode with a switching frequency of about 108.5 KHz.

The PFM frequency can be found from the BST_PFM signal shown in the plot 302, which settles within 50 microseconds (usec) as compared to the millisecond (msec) time scale associated with the existing technique. Note that when the BST_PFM signal in the plot 302 is high, the boost circuit 210 skips the switching pulses, which implies that there would not be any inductor current pulses in the plot 306.

Figure 4:
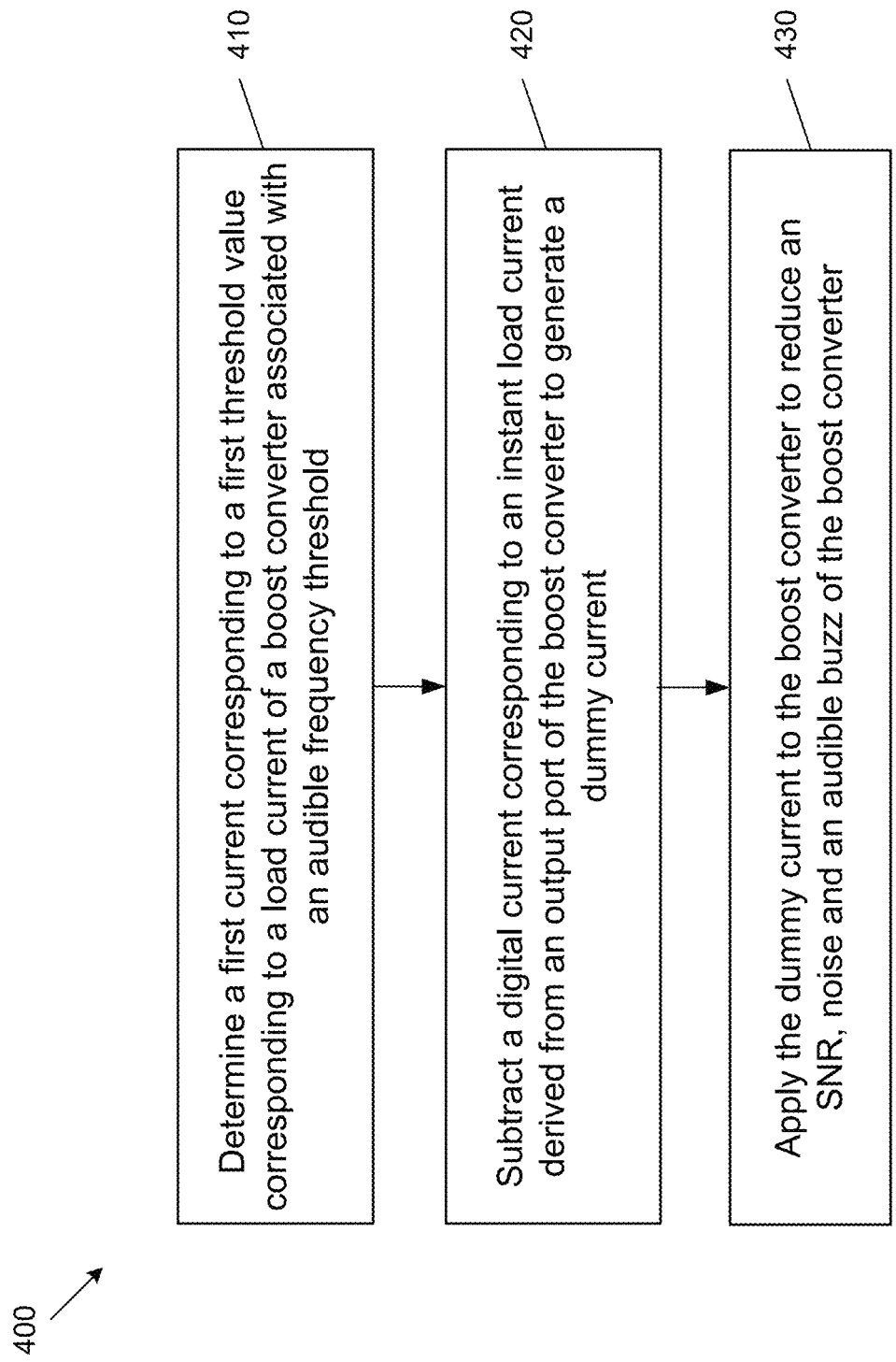
FIG. 4 illustrates a flow diagram illustrating an example of a process for implementing an open loop scheme, according to aspects of the subject technology.

FIG. 4 is a flow diagram illustrating an example of a process 400 for implementing an open loop scheme, according to aspects of the subject technology. The process 400 includes determining a first current (e.g., current 202 of FIG. 2) corresponding to a first threshold value, corresponding to a load current (e.g., electrical current provided to LED 122 of FIG. 1) of a boost converter (e.g., boost circuit 210 of FIG. 2) associated with an audible threshold frequency (e.g., within a frequency range of 0 to 20 KHz) (block 410). The process 400 also includes subtracting (e.g., by third circuit 222 of FIG. 2) a digital current (e.g., current 204 of FIG. 2) corresponding to an instant load current derived from an output port (e.g., 212 of FIG. 2) of the boost converter to generate a dummy current (e.g., dummy current 208 of FIG. 2) (block 420). The process 400 further includes applying the dummy current to the boost converter to reduce an audible buzz of the boost converter (block 430).

Figure 5:
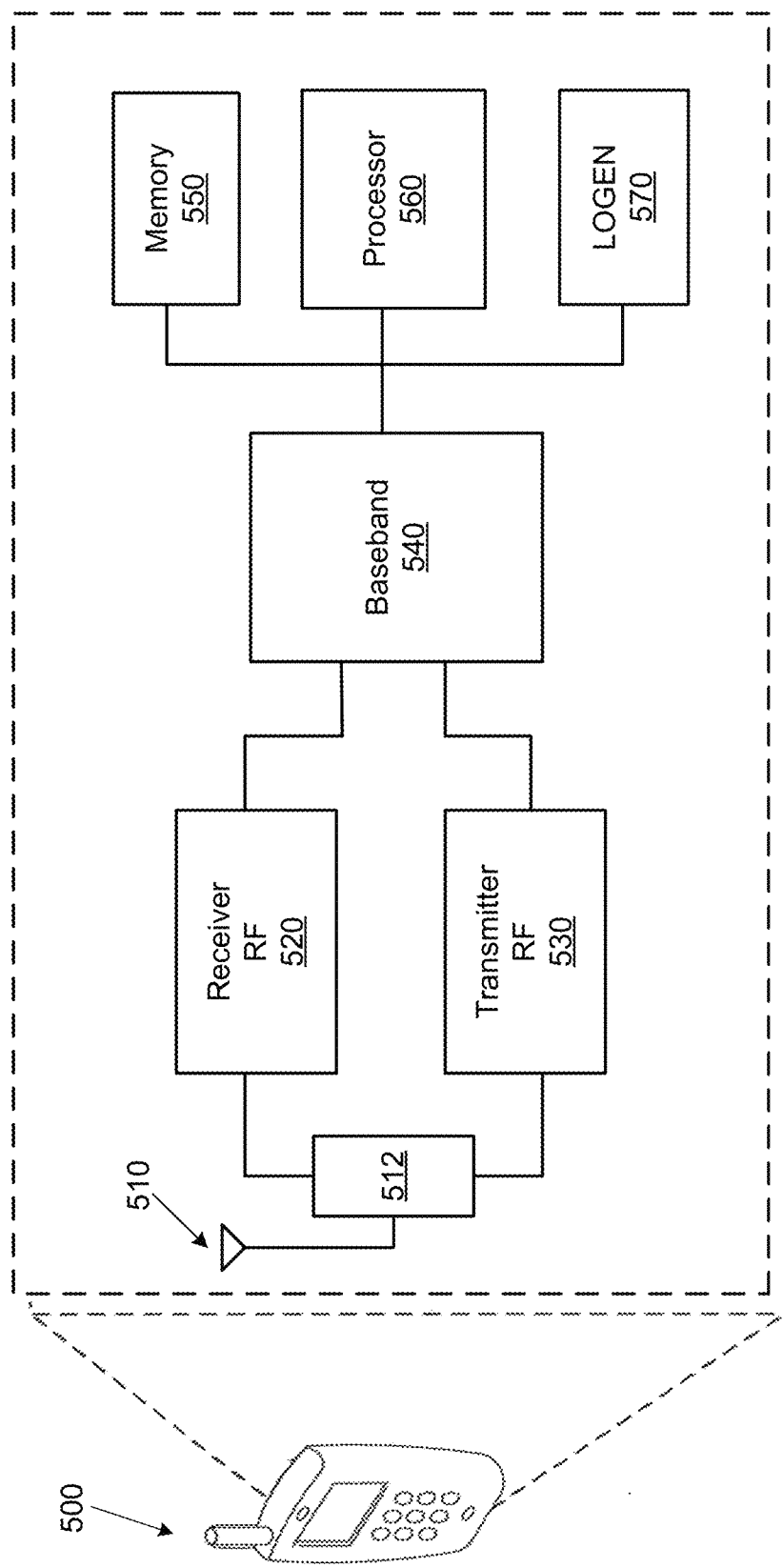
FIG. 5 illustrates an example of a wireless communication device, within which some aspects of the subject technology are implemented.

FIG. 5 illustrates an example of a wireless communication device 500, within which some aspects of the subject technology are implemented. In one or more implementations, the wireless communication device 500 can be a smartphone, a smartwatch, or other electronic apparatus, including one or more health-sense device(s). The wireless communication device 500 may comprise an RF antenna 510, a duplexer 512, a receiver 520, a transmitter 530, a baseband processing module 540, a memory 550, a processor 560, and a local oscillator generator (LOGEN) 570. In various aspects of the subject technology, one or more of the blocks represented in FIG. 5 may be integrated on one or more semiconductor substrates. For example, blocks 520-570 may be realized in a single chip, a single system on a chip, or in a multichip chipset.

The receiver 520 may comprise suitable logic circuitry and/or code that may be operable to receive and process signals from the RF antenna 510. The receiver 520 may, for example, be operable to amplify and/or down convert received wireless signals. In various aspects of the subject technology, the receiver 520 may be operable to cancel noise in received signals and may be linear over a wide range of frequencies. In this manner, the receiver 520 may be suitable for receiving signals in accordance with a variety of wireless standards such as Wi-Fi, WiMAX, BT, and various cellular standards. In various aspects of the subject technology, the receiver 520 may not use any sawtooth acoustic wave filters, and a few or no off-chip discrete components such as large capacitors and inductors.

The transmitter 530 may comprise suitable logic circuitry and/or code that may be operable to process and transmit signals from the RF antenna 510. The transmitter 530 may, for example, be operable to upconvert baseband signals to RF signals and amplify RF signals. In various aspects of the subject technology, the transmitter 530 may be operable to upconvert and amplify baseband signals processed in accordance with a variety of wireless standards. Examples of such standards may include Wi-Fi, WiMAX, BT, and various cellular standards. In various aspects of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer 512 may be operable in multiple frequency bands of various wireless standards.

The baseband processing module 540 may comprise suitable logic, circuitry, interfaces, and/or code that may be operable to perform the processing of baseband signals. The baseband processing module 540 may, for example, analyze received signals, generate control, and/or feedback signals for configuring various components of the wireless communication device 500 such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control the transfer of data between various portions of the wireless communication device 500. Additionally, the processor 560 may enable implementation of an OS or otherwise execute code to manage operations of the wireless communication device 500. In one or more implementations, the processor 560 may be interfaced with one or more transducer modules via existing host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducers module to the processor 560.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various aspects of the subject technology, information stored in the memory 550 may be utilized for configuring the receiver 520 and/or the baseband processing module 540.

The LOGEN 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals, such as the frequency and duty cycle, may be determined based on one or more control signals from, for example, the processor 560 and/or the baseband processing module 540.

In operation, the processor 560 may configure the various components of the wireless communication device 500 based on a wireless standard according to which it is designed to receive signals. Wireless signals may be received via the RF antenna 510, amplified, and down converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 500, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

In some implementations, all active components of the wireless communication device 500, for example, the receiver 520, the transmitter 530, the baseband processing module 540, the memory 550, the processor 560, and the LOGEN 570 may receive power from a power supply, including an SMPS including the integrated circuit 200 of FIG. 2 of the subject technology and benefit from the audible-noise-free and reduced-SNR features of the disclosed technology.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to," "operable to," and "programmed to" do not imply any particular tangible or intangible modification of a subject, but rather are intended to be used interchangeably. For example, a processor configured to monitor and control an operation or a component may also mean the processor is being programmed to monitor and control the operation, or the processor being operable to monitor and control the operation. Likewise, a processor configured to execute code can be construed as a processor programmed to execute code or operable to execute code.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known, or later come to be known to those of ordinary skill in the art, are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A circuit, comprising:
   a boost circuit;
   a first circuit coupled to the boost circuit and comprising a digital-to-analog converter (DAC); and
   a second circuit coupled to the boost circuit, wherein:
   the boost circuit, the first circuit, and the second circuit form an open loop,
   the first circuit and the second circuit are configured to maintain a switching frequency of the boost circuit above a threshold frequency, and
   the first circuit is configured to:
      receive a first current and a second current, and
      subtract the second current from the first current to provide a third current to the DAC.

2. The circuit of claim 1, wherein
   the DAC is a current DAC and is configured to receive an input from the third circuit.

3. The circuit of claim 1, wherein:
   the DAC is configured to convert the third current to an analog current and provide the analog current to the boost circuit.

4. The circuit of claim 3, wherein the analog current is configured to maintain the switching frequency of the boost circuit above the threshold frequency.

5. The regulator circuit of claim 1, wherein the second circuit comprises a controller configured to provide a clock signal to the boost circuit to control the switching of the boost circuit.

6. The regulator circuit of claim 5, wherein the clock signal comprises a pulse-width modulation (PWM) clock.

7. The circuit of claim 1, wherein the threshold frequency comprises an audible threshold frequency.

8. The circuit of claim 7, wherein based on the open loop, the first circuit does not provide an input to the second circuit.

9. The circuit of claim 1, based on the open loop, the second circuit does not provide an input to the first circuit.

10. The circuit of claim 1, wherein the boost circuit is configured to provide a pulsed output current with a frequency higher than the threshold frequency to reduce audible noise.

11. An integrated circuit comprising:
    a regulator circuit, comprising:
       a digital-to-analog converter (DAC) circuit;
       a boost circuit configured to provide a pulsed output current; and
       a circuit coupled to the boost circuit and configured to maintain a switching frequency of the pulsed output current above a threshold frequency, wherein the circuit is configured to:
       receive a first current and a second current, and
       subtract the second current from the first current to provide a third current to the DAC.

12. The integrated circuit of claim 11, wherein the circuit comprises a controller circuit configured to generate a clock signal having a predetermined pulse width and a frequency for maintaining the switching frequency.

13. The integrated circuit of claim 12, wherein
    the DAC is configured to provide an analog current to the boost circuit, and
    the analog current is configured to cause the switching frequency to be maintained above the threshold frequency.

14. The integrated circuit of claim 13, wherein the boost circuit, the controller circuit, and the DAC circuit form an open loop.

15. The integrated circuit of claim 13, wherein the DAC is configured to receive a digital current corresponding to a load current selected based on the threshold frequency and convert the digital current to the analog current.

16. A communication device comprising:
    a regulator circuit comprising:
       a boost circuit; and
       a first circuit coupled to the boost circuit and configured to receive a first current from a first source; and
       a second circuit coupled to the boost circuit and configured to receive a second current from a second source separate from the first source, wherein the first circuit and the second circuit are configured to maintain a switching frequency of the boost above a threshold frequency, wherein
       the first current comprises a digital current corresponding to a first threshold value, and
       the second current comprises an analog current having a predetermined value that causes the boost circuit to operate in a pulse-frequency modulation (PFM) mode.

17. The communication device of claim 16, wherein the first circuit is configured to provide a current to the boost circuit, the current selected to maintain the switching frequency.

18. The communication device of claim 16, wherein the second circuit is configured to provide a pulsed output to the boost circuit to maintain the switching frequency.

19. The communication device of claim 16, wherein:
the first circuit, the second circuit and the boost circuit are arranged to form an open loop.

\* \* \* \* \*